(12) United States Patent
Theriot

(10) Patent No.: US 10,119,646 B1
(45) Date of Patent: Nov. 6, 2018

(54) HYDRAULIC CHAIN CLAMP APPARATUS FOR PIPE REPAIR SLEEVES

(71) Applicant: Mathey Investments, Inc., Tulsa, OK (US)

(72) Inventor: Peter Theriot, Tulsa, OK (US)

(73) Assignee: Mathey Investments, Inc., Tulsa, OK (US)

(*) Notice: Subject to any disclaimer, the term of this patent is extended or adjusted under 35 U.S.C. 154(b) by 154 days.

(21) Appl. No.: 15/152,715

(22) Filed: May 12, 2016

Related U.S. Application Data

(60) Provisional application No. 62/181,611, filed on Jun. 18, 2015.

(51) Int. Cl.
| | |
|---|---|
| *B23P 11/00* | (2006.01) |
| *F16L 55/17* | (2006.01) |
| *B23P 6/04* | (2006.01) |
| *F16L 55/168* | (2006.01) |
| *B23K 37/053* | (2006.01) |

(52) U.S. Cl.
CPC ...... *F16L 55/1705* (2013.01); *B23K 37/0533* (2013.01); *B23P 6/04* (2013.01); *F16L 55/1683* (2013.01)

(58) Field of Classification Search
CPC .......... B23Q 1/00; B23Q 1/0018; B23Q 1/25; B23Q 3/06
See application file for complete search history.

(56) References Cited

U.S. PATENT DOCUMENTS

| | | | |
|---|---|---|---|
| 1,971,649 A | 8/1934 | Furman et al. | |
| 1,998,729 A | 4/1935 | Mathey et al. | |
| 2,182,258 A | 12/1939 | Kirk | |
| 2,862,295 A * | 12/1958 | Harding | B23D 21/08 |
| | | | 225/103 |
| 2,949,669 A * | 8/1960 | Wheeler | B23D 21/08 |
| | | | 225/103 |
| 3,139,317 A | 6/1964 | Lynch | |
| 3,157,945 A | 11/1964 | Picking | |
| 3,586,057 A | 6/1971 | Lambert | |
| 5,012,842 A * | 5/1991 | Savard | F16L 55/17 |
| | | | 138/161 |
| 5,123,451 A * | 6/1992 | Savard | F16L 55/17 |
| | | | 138/99 |
| 5,577,535 A | 11/1996 | Motta et al. | |
| 5,692,544 A | 12/1997 | Friedrich et al. | |

(Continued)

OTHER PUBLICATIONS

Python Chain Clamp; Worldwide Machining & Welding, Inc. Product Details: Model Nos. 1028 and 3048 Flyer.

*Primary Examiner* — Lee D Wilson
(74) *Attorney, Agent, or Firm* — Head, Johnson, Kachigian & Wilkinson, PC

(57) ABSTRACT

A hydraulic chain clamp apparatus for pipe sleeves for a pipe. The apparatus includes a clamping chain circumnavigating the sleeves and the pipe, the chain having a first end and an opposed second end. The apparatus includes a housing block with a chain lock mechanism securing the first end of the chain to the housing block. A hydraulic cylinder mechanism is connected to the housing block. The hydraulic cylinder mechanism is attached to the second end of the chain and is adapted to move the chain between a tightened, closed position and a loose, open position.

8 Claims, 7 Drawing Sheets

(56) References Cited

U.S. PATENT DOCUMENTS

| | | | |
|---|---|---|---|
| 6,122,827 A * | 9/2000 | Whitaker | B23D 21/00 30/100 |
| 6,675,836 B1 | 1/2004 | Gaston et al. | |
| 2008/0230972 A1 | 9/2008 | Ganley | |
| 2014/0124043 A1 | 5/2014 | Helmin et al. | |

* cited by examiner

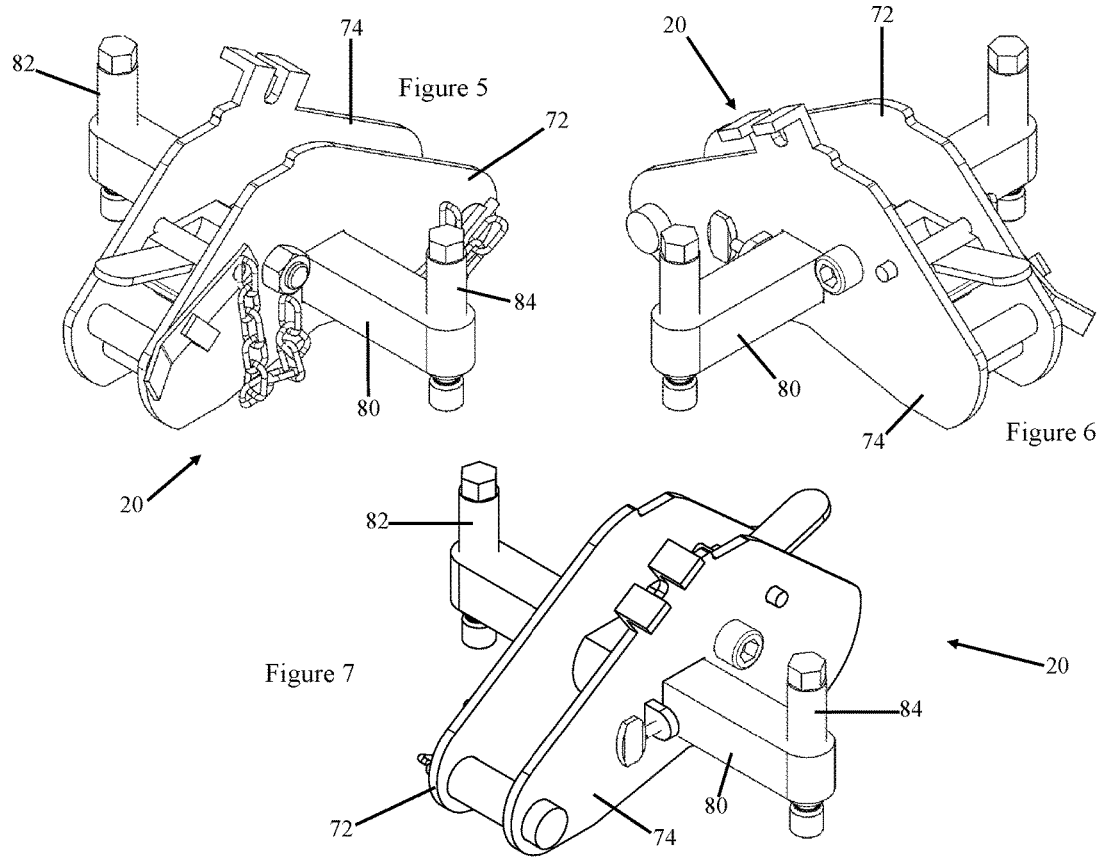

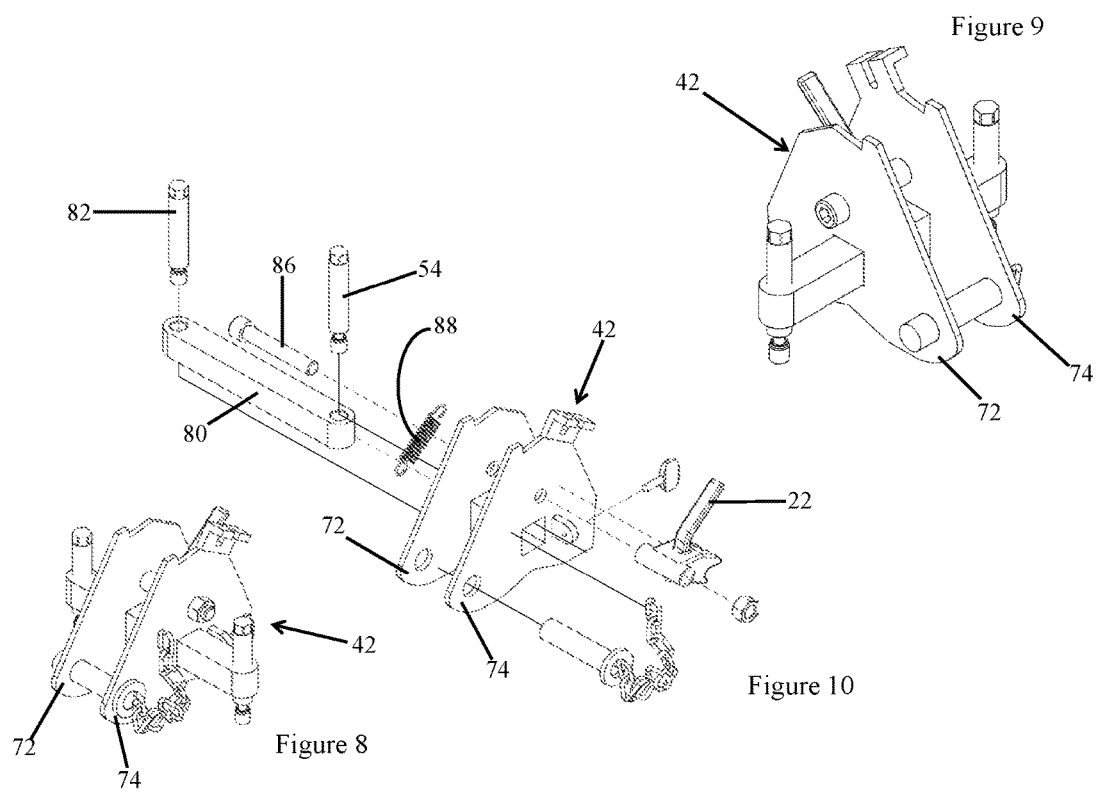

US 10,119,646 B1

HYDRAULIC CHAIN CLAMP APPARATUS FOR PIPE REPAIR SLEEVES

CROSS-REFERENCE TO RELATED APPLICATIONS

This application claims priority to and the benefit of U.S. Provisional Patent Application Ser. No. 62/181,611, filed Jun. 18, 2015, which is herein incorporated in its entirety by reference.

BACKGROUND OF THE INVENTION

1. Field of the Invention

The present invention is directed to a hydraulic chain clamp apparatus for pipe repair sleeves for repair or reinforcement of a pipe or a pipeline. In particular, the present invention provides a portable chain clamp apparatus to be used during fit up and/or welding of metal sleeves to a pipe or pipeline.

2. Prior Art

In order to repair a leak or rupture in or reinforce a metal pipe or pipeline, one method is to utilize two or more sleeves in the form of half cylinders or clam shaped half sleeves which are brought around the existing pipeline. The sleeves are held in place and tightened or squeezed around the cylindrical pipe or pipeline. Thereafter, the sleeves are welded together around the pipe or pipeline.

Various attempts have been made in the past to design a chain clamp apparatus.

For example, Savard (U.S. Pat. No. 5,012,842) discloses a fluid actuated pipe chain clamp having a pair of jaws or arms forming a scissor clamp connected to the ends of a chain. A fluid actuated cylinder is capable of tightening the chain.

Furman et al. (U.S. Pat. No. 1,971,649) discloses a device to assist in plugging small leaks in secondary pipe joints. A torque nut and a single fastener act as a chain retention mechanism.

Kirk (U.S. Pat. No. 2,182,258) discloses a device for plugging small leaks in secondary pipe joints. A hand lever is utilized as a tightening mechanism.

Friedrich et al. (U.S. Pat. No. 5,692,544) discloses a belt-like chain and clamp device with a hydraulic cylinder pushing against a moveable plate to directly tighten the chain.

Helmin et al. (U.S. Patent Publication No. 2014/0124043) discloses a pipe jack having a hydraulic jack and a roller chain. A sprocket head has radial projections that engage the roller chain.

Notwithstanding the foregoing, there remains a need to provide a portable, yet stable, fluid or hydraulic actuated chain clamp apparatus which will be simple to use while retaining the repair sleeves in place for welding.

There is further a need for a chain clamp apparatus that may be readily transported to and used in a variety of field locations.

There is further a need for a chain clamp apparatus having a hydraulic mechanism directly connected and in-line with the clamping chain to be tightened.

SUMMARY OF THE INVENTION

The present invention is directed to a hydraulic chain clamp apparatus which draws or squeezes repair sleeves together around a pipe or pipeline to be repaired. An inside diameter of the repair sleeves is slightly larger than the outside diameter of the pipe or pipeline to be repaired.

A clamping chain is wrapped around the outside of the repair sleeves so that it circumnavigates both the repair sleeves and the pipe or pipeline.

A housing block has a base which rests on at least one of the repair sleeves. The clamping chain has a first end which is secured to the housing block by a lock mechanism, which may be manually moved from a locked to an unlocked position in order to release the first end of the chain therefrom.

The opposite or second end of the clamping chain is attached to a hydraulic cylinder mechanism mounted on the housing block. The hydraulic cylinder mechanism is tangential to the repair sleeves. The hydraulic cylinder mechanism is direct acting and in-line with the chain.

The hydraulic cylinder mechanism includes a hydraulic connector which is detachably connected to a hand actuated hydraulic pump.

An optional adjustable stabilizer jack bar assembly extends from each side of the housing block and rests on one of the sleeves.

BRIEF DESCRIPTION OF THE DRAWINGS

FIGS. 5, 6 and 7 show alternate perspective views of a housing block for the chain clamp apparatus shown in FIGS. 1A and 1B; and FIGS. 8, 9 and 10 show alternate views of a housing block for the chain clamp apparatus shown in FIGS. 2A and 2B.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figures 1A, 1B:
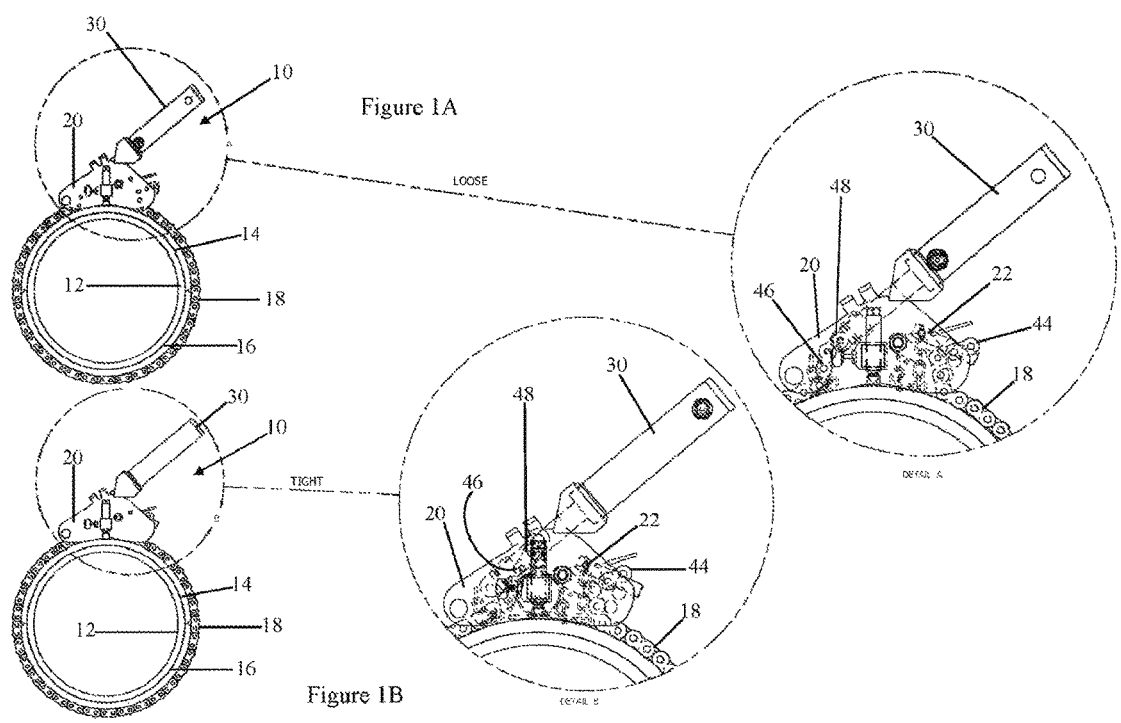
FIGS. 1A and 1B illustrate a first preferred embodiment of a hydraulic chain clamp apparatus for pipe repair sleeves constructed in accordance with the present invention.

FIGS. 1A and 1B illustrate a first preferred embodiment of a hydraulic chain clamp apparatus 10 of the present invention. FIG. 1A illustrates the apparatus 10 in a loose or opened position while FIG. 1B illustrates the apparatus 10 in a tightened or closed position.

The chain clamp apparatus 10 draws or squeezes a pair of sleeve halves 14 and 16 together which are placed around the pipe or pipeline 12. Each of the sleeve halves 14 and 16 is a half cylinder having a pair of opposed edges which mate together to form a cylinder. An inside diameter of the sleeve halves 14 and 16 is slightly larger than the outside diameter of a pipe or pipeline 12.

A clamping chain 18 is wrapped around the outside of the repair sleeve halves 14 and 16 so that it circumnavigates both the sleeve halves 14 and 16 and the pipe or pipeline 12. The clamping chain 18 may take a variety of forms, such as a double leaf chain, a single leaf and/or roller leaf chain.

A housing block 20 has a base which rests on at least one of the repair sleeve halves 14 and 16.

The clamping chain 18 has a first chain end 44 which is secured to the housing block 20 by a lock mechanism 22, to be described in detail herein. The lock mechanism 22 may be manually moved from a locked to an unlocked position in order to release the first chain end 44 of the chain 18 therefrom. When in the unlocked position, the first chain end 44 may be adjusted or detached from the block 20.

The opposite or second chain end 46 of the clamping chain 18 is attached to a link connector 48 which, in turn, is connected to a ram of a hydraulic pulling cylinder 30.

Figure 2A:
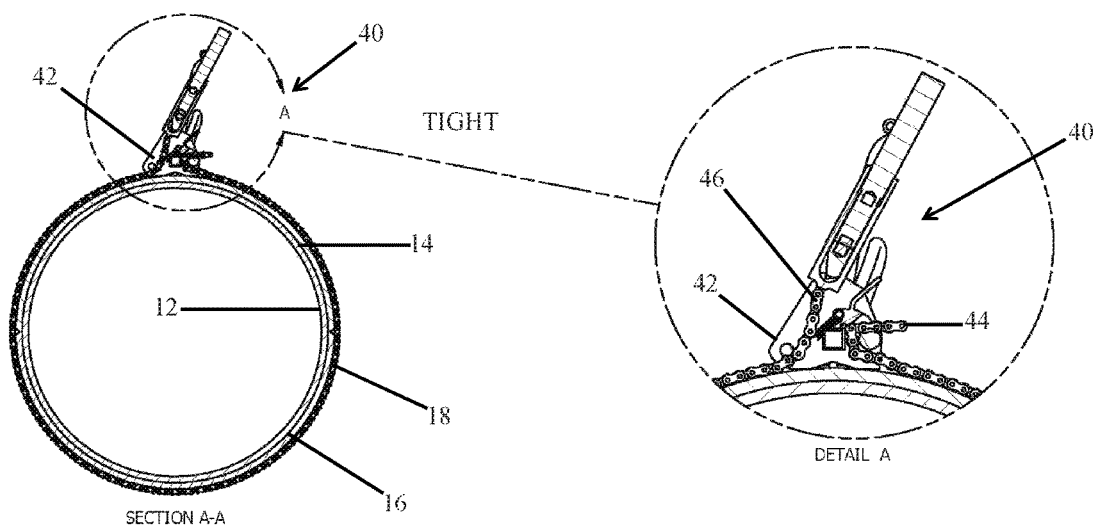
FIGS. 2A and 2B illustrate an alternate preferred embodiment of a hydraulic chain clamp apparatus constructed in accordance with the present invention.
Figure 2B:
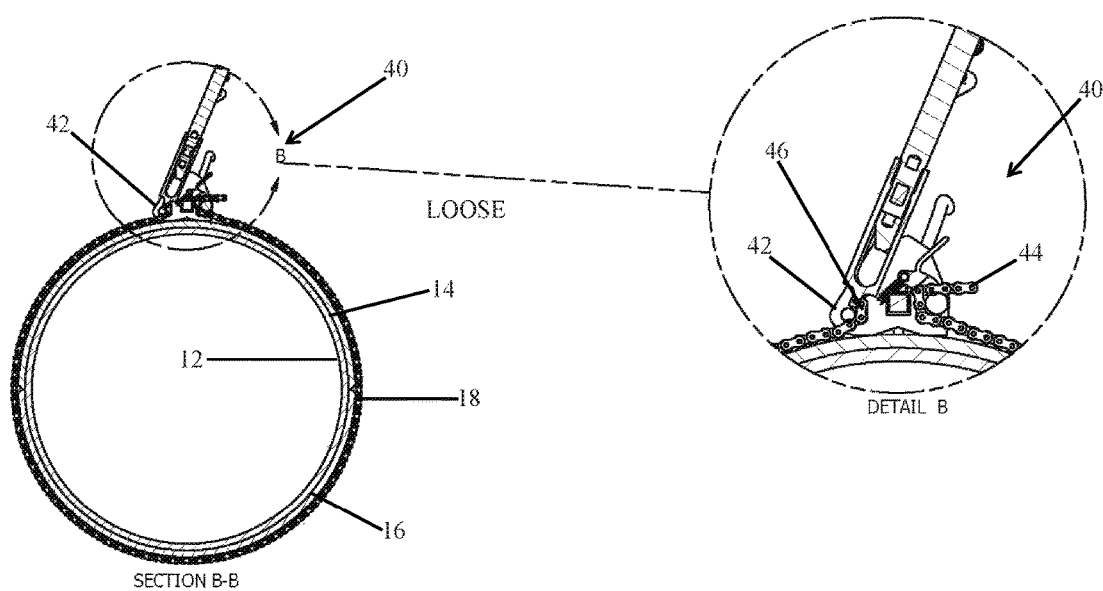

FIGS. 2A and 2B show an alternate preferred embodiment of the present invention for a hydraulic chain clamp apparatus 40 of the present invention. FIG. 2A illustrates the apparatus 40 in the tightened or closed position while FIG. 2B illustrates the apparatus 40 in the loose or opened position.

The chain clamp apparatus 40 draws or squeezes a pair of sleeve halves 14 and 16 together. Each of the sleeve halves 14 and 16 is a half cylinder having a pair of edges which mate together to form a cylinder. An inside diameter of the sleeve halves 14 and 16 is slightly larger than the outside diameter of the pipe or pipeline 12.

The clamping chain 18 is wrapped around the outside of the sleeve halves 14 and 16 so that it circumnavigates both the repair sleeve halves 14 and 16 and the pipe or pipeline 12.

The apparatus 40 includes a housing block 42 having a base which rests on at least one of the sleeve halves 14 and 16.

Figure 3:
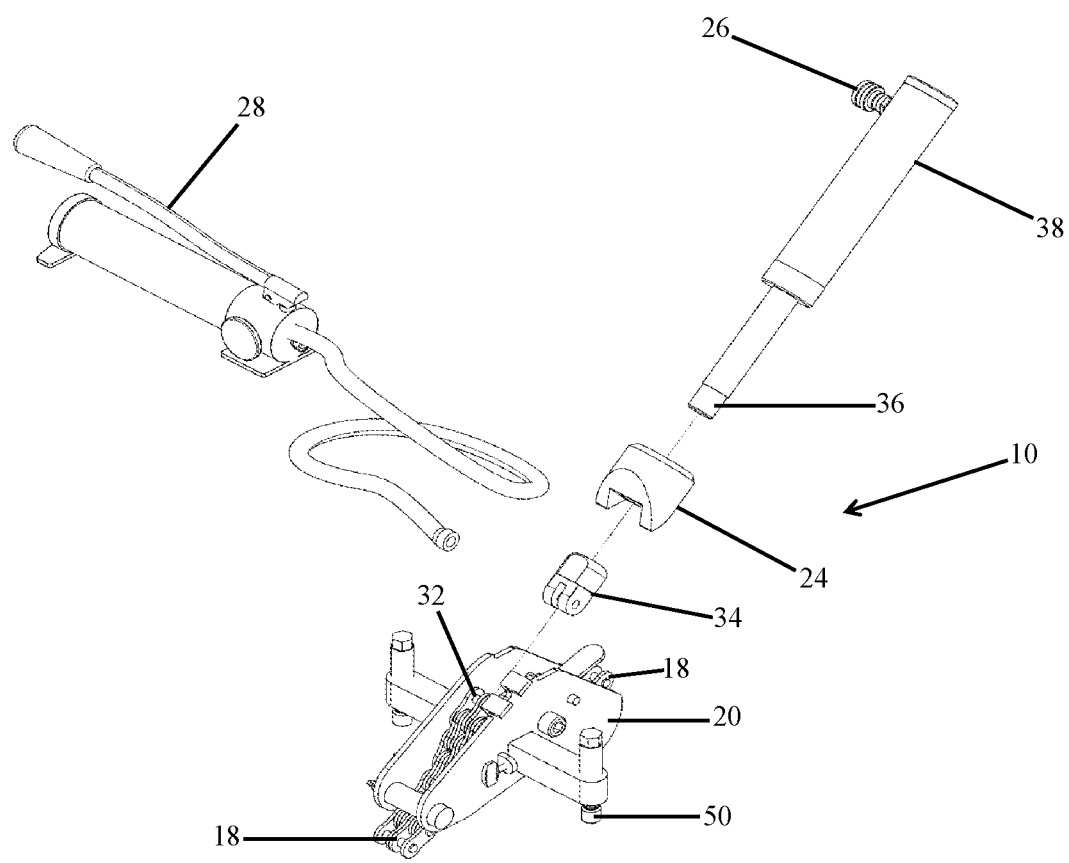
FIG. 3 illustrates an exploded view of the first preferred embodiment of the apparatus shown in FIGS. 1A and 1B with portions of a chain clamp removed.

FIG. 3 illustrates an exploded view of the first preferred embodiment of the apparatus 10 (shown in FIGS. 1A and 1B) apart from the pipe or pipeline 12 and the sleeve halves 14 and 16. The clamping chain 18 has been partially cut-away for ease of viewing.

The second chain end 46 of the clamping chain 18 terminates in a master link 32 which is connected to a piston adaptor 34 for connection to a ram 36 in a hydraulic cylinder 38 of a hydraulic cylinder mechanism. The ram 36 and hydraulic cylinder 38 are tangential to the repair sleeve halves 14 and 16. Because the ram 36 and the hydraulic cylinder 38 are tangential to the repair sleeves, the force of the hydraulic cylinder mechanism is very efficient.

The hydraulic cylinder 38 is connected to the housing block 20 through a barrel head 24. The hydraulic cylinder mechanism includes a hydraulic connector 26 which is detachably connected to a hand actuated hydraulic pump 28.

The hydraulic cylinder mechanism, accordingly, is direct acting and in-line with the clamping chain 18 to be tightened. As the hydraulic cylinder mechanism is actuated, the chain slack is decreased which draws the half sleeves together.

An optional stabilizer jack bar assembly 50, to be described in detail, extends from each side of the housing block 20 and rests on one of the sleeves. The jack bar 50 serves to stabilize the chain clamp apparatus, when necessary.

Figure 4:
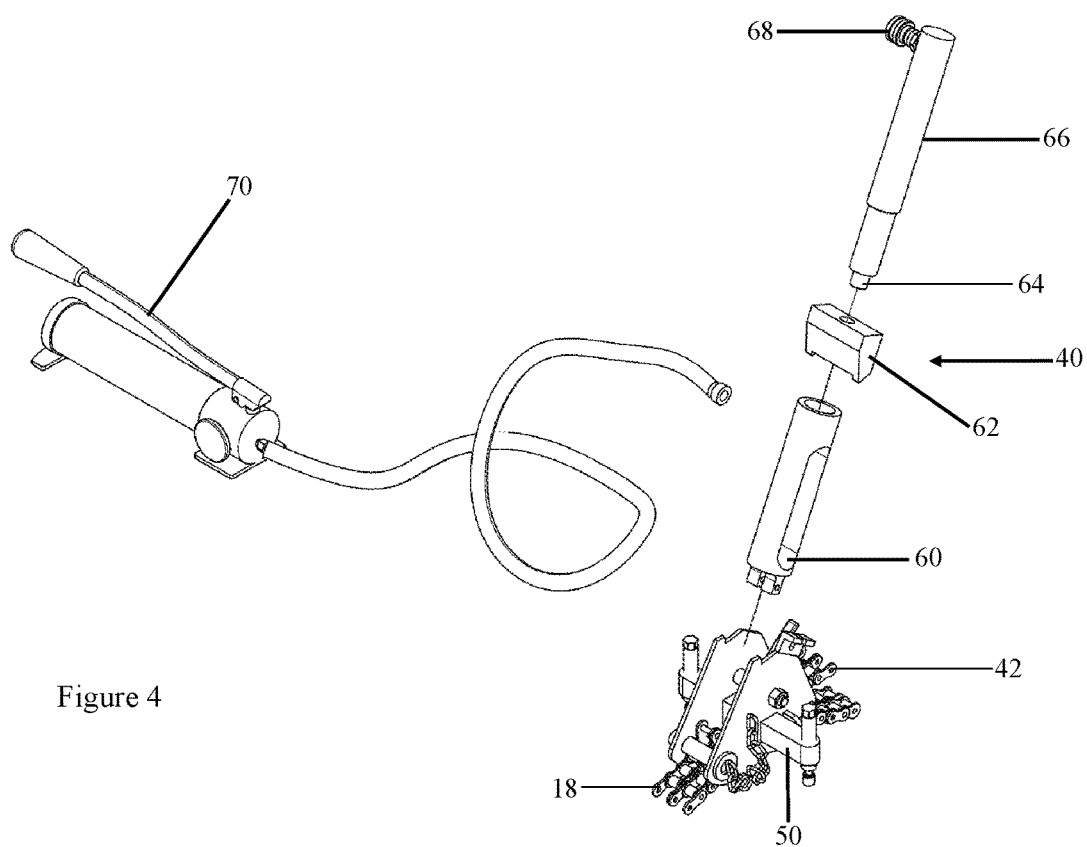
FIG. 4 illustrates an exploded view of the alternate embodiment of the chain clamp apparatus shown in FIGS. 2A and 2B with portions of a chain clamp removed.

FIG. 4 illustrates an exploded view of the alternate embodiment of the chain clamp apparatus 40 apart from the pipe sleeve halves 14 and 16 and the pipe or pipeline 12 to be repaired. The clamping chain 18 is shown partially cut-away for ease of viewing.

The second chain end 46 of the clamping chain 18 is connected to a cylinder barrel head 60 which is secured to the housing block 42. A piston head 62, a threaded cylinder insert 64 and a hydraulic push cylinder 66 are capable of reciprocating within the cylinder barrel head 60. The cylinder barrel head 60 and the hydraulic push cylinder 66 are tangential to the repair sleeves 14 and 16. Because the cylinder barrel head 60 and the hydraulic push cylinder 66 are tangential to the repair sleeves, the force is very efficient.

The hydraulic push cylinder 66 has an extending hydraulic connector 68 which may be detachably connected to a hand actuated hydraulic pump 70.

The hydraulic cylinder mechanism is, accordingly, direct acting and in-line with the clamping chain to be tightened. As the hydraulic cylinder mechanism is actuated, the chain slack is decreased which draws the half sleeves together.

FIGS. 5, 6 and 7 show alternate perspective views of the housing block 20 with the clamping chain 18 and the hydraulic cylinder mechanism removed. The housing block 20 may include a pair of opposed plates 72 and 74 with a space therebetween. When installed, the plates 72 and 74 are substantially perpendicular to the axis of the pipe 12.

The optional jack bar assembly 50 includes a beam 80 passing through the housing block 20 parallel to the axis of the pipe sleeves 14 and 16 and the pipe or pipeline. A pair of opposed threaded jack screws 82 and 84 are threadably received through openings in the beam 80 to engage the pipeline sleeves. Accordingly, the length of the jack screws 82 and 84 may be adjusted. The jack screws 82 and 84 engage at least one of the pipe sleeves.

FIGS. 8 and 9 show alternate views of the housing block 42 apart from the apparatus while FIG. 10 shows an exploded view of the housing block 42.

The chain lock mechanism 22 rotates about a pin 86 to rotate about an axis parallel to the pipe 12 between a locked position engaging the chain 18 (not seen in FIG. 8, 9 or 10) and an open position. A spring 88 urges the lock mechanism to a locked position.

In order to utilize the apparatus 10, a clamping chain 18 is wrapped around the pipe or pipeline sleeve halves 14 and 16 that have been put in place around the pipe or pipeline 12 to be repaired or reinforced. The clamping chain 18 is wrapped around the sleeve halves so that the clamping chain 18 circumnavigates them.

A first end of the clamping chain is locked to the housing block 42 with locking mechanism 22.

Thereafter, the clamping chain 18 is tightened around the sleeve halves 14 and 16 by activating the hydraulic cylinder mechanism 38 mounted on the housing block 20. The hydraulic cylinder mechanism 38 is attached to a second end of the clamping chain 18 as previously described. The hydraulic cylinder mechanism 38 is activated by operation of a hand hydraulic pump.

Once the sleeve halves 14 and 16 are tightened around the pipe or pipeline 12, the sleeve halves 14 and 16 are welded to each other and are welded to the pipe or pipeline 12.

Once the welding operation has been completed, the chain lock mechanism 22 is unlocked in order to release the clamping chain 18. The apparatus can then be removed from the sleeve halves 14 and 16.

Whereas, the present invention has been described in relation to the drawings attached hereto, it should be understood that other and further modifications, apart from those shown or suggested herein, may be made within the spirit and scope of this invention.

What is claimed is:

1. A hydraulic clamp apparatus for pipe sleeves for a pipe, which apparatus comprises:
   a clamping chain circumnavigating said sleeves and said pipe, said chain having a first end and an opposed, second end;
   a housing block;
   a chain lock mechanism securing said first end of said chain to said housing block;
   a hydraulic cylinder mechanism connected to said housing block, wherein said hydraulic cylinder mechanism has an axis which is substantially tangential to said sleeves, and said hydraulic cylinder mechanism is attached to said second end of said chain adapted to move said chain between a tightened, closed position and a loose, open position.

2. A hydraulic chain clamp apparatus as set forth in claim 1 wherein said hydraulic cylinder mechanism includes a ram extended when said chain is in said tightened position.

3. A hydraulic chain clamp apparatus set forth in claim 1 wherein said hydraulic cylinder mechanism includes a ram extended when said chain is in said loose position.

4. A hydraulic chain clamp apparatus as set forth in claim 1 wherein said chain lock mechanism includes a chain link dog engageable with said first end of said clamping chain and rotatable about an axis parallel to said pipe.

5. A hydraulic chain clamp apparatus as set forth in claim 1 including a hand operated hydraulic pump detachably connected to said hydraulic cylinder mechanism.

6. A hydraulic chain clamp apparatus as set forth in claim 1 wherein said pipe sleeves comprise a pair of sleeves, each of said pair of sleeves forming a half cylinder with an inner diameter slightly larger than an outer diameter of said pipe.

7. A hydraulic clamp apparatus for pipe sleeves for a pipe, which apparatus comprises:
   a clamping chain circumnavigating said sleeves and said pipe, said chain having a first end and an opposed, second end;
   a housing block;
   a chain lock mechanism securing said first end of said chain to said housing block;
   a hydraulic cylinder mechanism connected to said housing block, said hydraulic cylinder mechanism attached to said second end of said chain adapted to move said chain between a tightened, closed position and a loose, open position; and
   a stabilizer jack bar assembly extending from said housing block.

8. A hydraulic clamp apparatus as set forth in claim 7 wherein said jack bar assembly includes a pair of threaded jack screws.

* * * * *